United States Patent

[11] 3,617,420

| | | |
|---|---|---|
| [72] | Inventor | Curtis E. McCann<br>Corvallis, Oreg. |
| [21] | Appl. No. | 776,648 |
| [22] | Filed | Nov. 18, 1968 |
| [45] | Patented | Nov. 2, 1971 |
| [73] | Assignee | Neptune Microfloc, Incorporated<br>Corvallis, Oreg. |

[54] APPARATUS FOR MAKING MULTIPLE CHANNEL LIQUID TREATING UNIT
20 Claims, 14 Drawing Figs.

[52] U.S. Cl. .................................................. 156/382,
156/556, 156/583
[51] Int. Cl. ........................................................ B32b 31/20,
B30b 15/34
[50] Field of Search ................................................ 156/381,
382, 548, 196, 197, 420, 471, 556, 562, 65, 580,
583

[56] References Cited
UNITED STATES PATENTS

| 2,642,918 | 6/1953 | Janowski .................... | 156/471 X |
| 3,413,765 | 12/1968 | Williams et al. ............. | 156/197 X |
| 3,139,369 | 6/1964 | Sullivan et al. ............... | 156/580 UX |
| 3,376,184 | 4/1968 | Ritchey et al. ............... | 156/580 |

Primary Examiner—Benjamin A. Borchelt
Assistant Examiner—J. J. Devitt
Attorney—Buckhorn, Blore, Klarquist and Sparkman ABSTRACT: Apparatus is described for manufacturing a liquid treating unit including a plurality of rows of parallel channel members secured between sidewall members with successive rows inclined in opposite directions and separated by a sidewall member. The apparatus includes a jig for supporting the channel members of one row and a pair of support plates pivotally mounted on opposite sides of the jig for supporting a pair of sidewall members to enable attachment thereof to the side edges of such channel members and formation of a channel module. Air pressure instead may be employed for supporting the sidewall members in engagement with the channel members. The members may be of plastic material and are attached together by a solvent sprayed from nozzles attached to the jig or by thermal fusion with electrical heating strips. However it is also possible to use members of cardboard or treated paper and attached by a suitable glue. A plurality of channel modules are connected together by additional rows of channel members to form the complete unit in several steps with the same apparatus. However, in one embodiment, all of the modules forming the unit are made simultaneously by employing a plurality of jigs, successive ones of which hold rows of channel members inclined in opposite directions and are mounted on two jig supports that are moved relative to each other to enable removal of the completed unit.

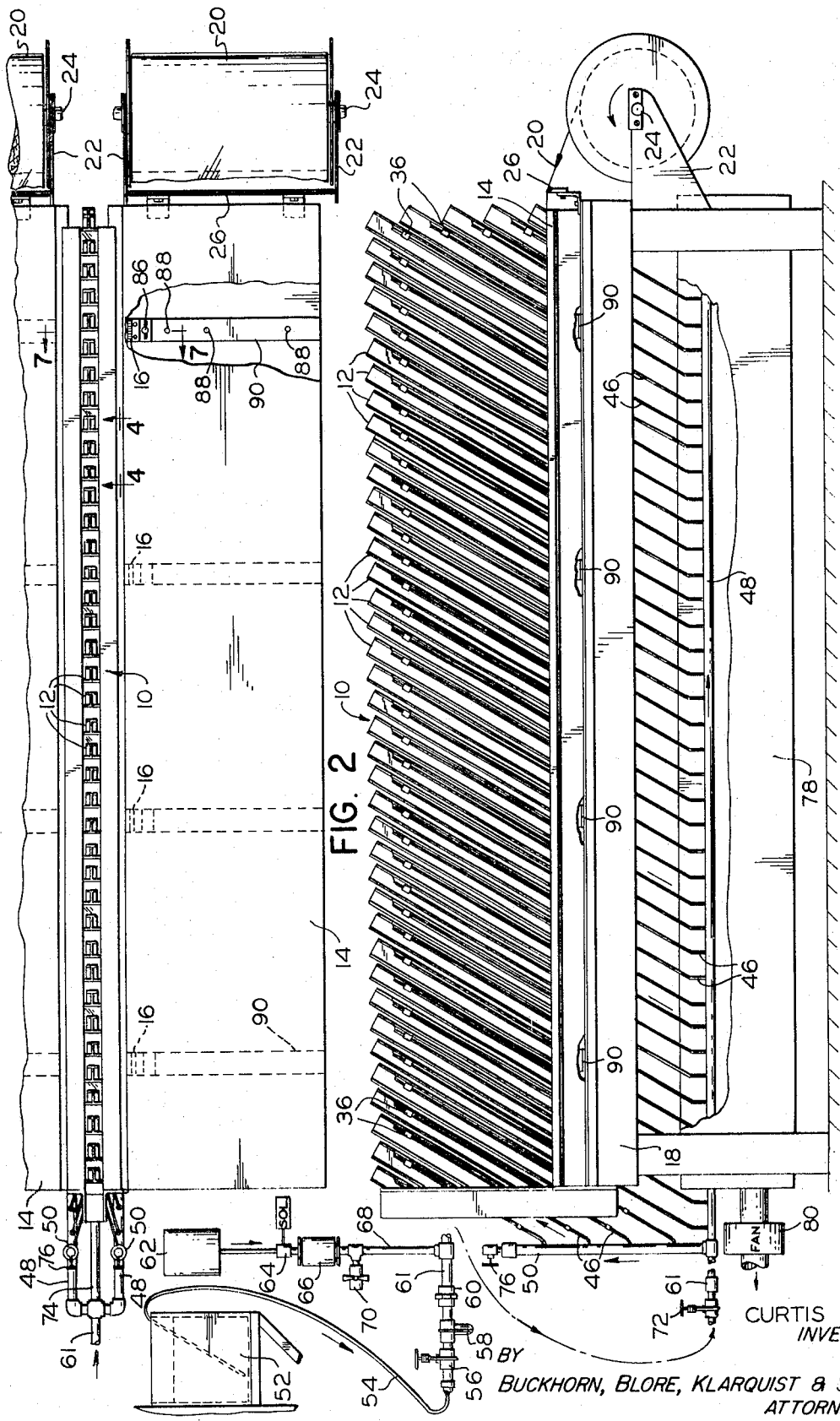

CURTIS E. McCANN
INVENTOR

BY
BUCKHORN, BLORE, KLARQUIST & SPARKMAN
ATTORNEYS

PATENTED NOV 2 1971 3,617,420

CURTIS E. McCANN
INVENTOR

BY
BUCKHORN, BLORE, KLARQUIST & SPARKMAN
ATTORNEYS

PATENTED NOV 2 1971 3,617,420

CURTIS E. McCANN
INVENTOR

BY
BUCKHORN, BLORE, KLARQUIST & SPARKMAN
ATTORNEYS 3,617,420

APPARATUS FOR MAKING MULTIPLE CHANNEL LIQUID TREATING UNIT

BACKGROUND OF THE INVENTION

The subject matter of the present invention relates generally to apparatus for manufacturing multiple channel liquid treating units of the type shown in copending U.S. Pat. application Ser. No. 721,250, filed Apr. 15, 1968, of C. E. McCann. The present invention specifically relates to an apparatus employing at least one jig for holding a plurality of parallel channel members in a row inclined in the same direction, support means for supporting a pair of sheet wall members on the opposite sides of the jig, and sealing means for attaching the sheet wall members to the side edges of such channel members in order to form a channel module and to connect a plurality of such modules together to form the complete liquid-treating unit.

The apparatus of the present invention enables the manufacture of multichannel liquid-treating units of uniform construction whose rows of channels are all of the same size and shape since the jig accurately spaces the channel members from each other a predetermined uniform amount. The present apparatus is extremely versatile in that it can be used to make several different sized units by changing the length or height of the modules and by interconnecting different numbers of modules to change the width of the unit. Furthermore, the apparatus is fast, simple and inexpensive in operation and enables all of the channel members of at least one row to be simultaneously sealed between the sidewall members. The sealing is accomplished quickly and accurately by supporting the spray nozzles, heating element or other sealing means in predetermined fixed positions on the jig. Also, in the case of one embodiment, a plurality of rows of channel members are all simultaneously sealed to their corresponding sidewall members to form the complete unit by a single sealing step.

It is therefore one object of the present invention to provide an improved apparatus for manufacturing multiple channel liquid treating units quickly and economically which operates in a simple, reliable manner;

Another object of the present invention is to provide an improved apparatus for manufacturing a plurality of multiple channel liquid treating units including a jig which enables such units to be uniform in structure.

A further object of the present invention is to provide an improved apparatus for making multiple channel liquid-treating units which is versatile in that the same apparatus can be used for making units of different sizes.

A still further object of the invention is to provide an improved apparatus for making a multiple channel liquid-treating unit in which a plurality of channel members are simultaneously sealed between a pair of sidewall members by a single sealing operation in a fast, accurate and reliable manner.

Still another object of the present invention is to provide an improved apparatus for making multiple channel liquid-treating units in which a jig is employed for holding a plurality of channel members to enable them to be attached between a pair of sidewall members simultaneously by a single sealing operation to form a channel module, and a plurality of such modules are fastened together in a similar manner to form a complete unit.

An additional object of the present invention is to provide an apparatus for manufacturing a multiple channel liquid-treating unit in which a plurality of jigs are employed for holding a plurality of rows of channel members to enable them to be attached to sidewall members between such rows simultaneously by a single sealing operation to form the complete unit.

BRIEF DESCRIPTION OF DRAWINGS

Additional objects and advantages of the present invention will be apparent from the following detailed description of preferred embodiments thereof and from the attached drawings of which:

FIG. 1 is a side elevation view of the manufactured apparatus of the present invention with pivoted support plates in a lowered position;

FIG. 2 is a plan view of the top of a portion of the apparatus of FIG. 1, with parts broken away for clarity;

DESCRIPTION OF PREFERRED EMBODIMENTS

Figure 3:
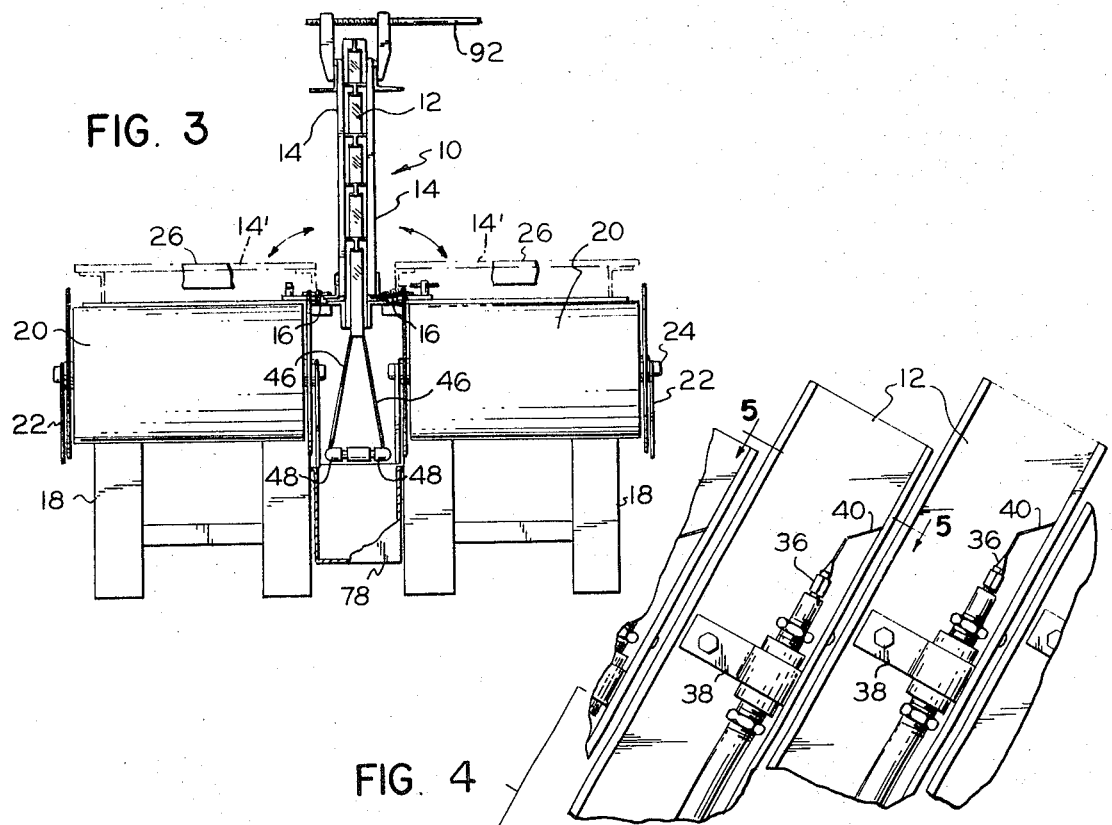
FIG. 3 is an elevation view of one end of the apparatus of FIG. 1 with the support plates moved to a raised position.

As shown in FIGS. 1, 2 and 3, the manufacturing apparatus of the present invention includes a rigid, nonexpandable jig 10 of fixed dimensions formed by a plurality of separate jig members 12, which are supported in parallel, uniformly spaced relationship to form a row of vertical jig members which are inclined at an angle of approximately 60° with respect to the horizontal. A pair of support plates 14 are pivotally mounted on opposite sides of the jig 10 by a plurality of hinges 16 which attach such support plates to the tops of a pair of support tables 18. The pivot axis of each of the support plates 14 extends parallel to the jig, such axis corresponding to that of the hinges 16 on the associated support plate. A pair of rolls 20 of sheet material which may be plastic, are supported on the ends of the support tables by brackets 22 engaging the opposite ends of the roller shafts 24. The sheets of plastic material 20 are fed onto the top of the support plates 14 when such support plates are in the lowered or open position shown in FIGS. 1 and 2. A portion is cut from the end of each of the plastic sheets while resting on the lowered support plates, by any suitable cutter means which may include a cutter guide 26 attached to the end of the support table 18 adjacent the roll 20. The cutter guide 26 is provided with a groove extending across the plastic sheet 20 into which the blade of a knife or other cutting tool is inserted and moved along such groove to cut the sheet.

Figure 5:
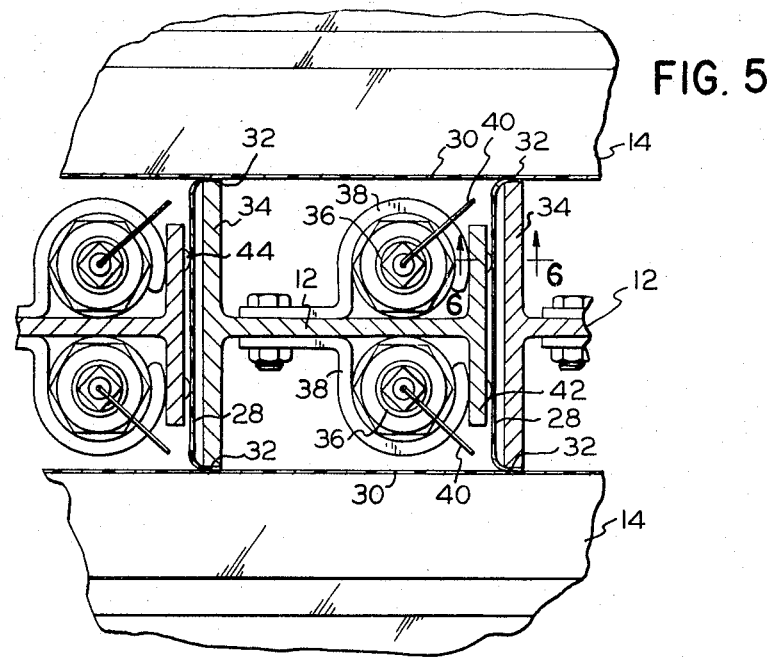
FIG. 5 is a sectional view taken along the line 5—5 of FIG. 4 showing the sealing operation with the support plates in a raised position.

A plurality of channel members 28 of plastic material are provided within the slots between adjacent jig members 12, as shown in FIG. 5. A pair of sidewall members 30 cut from the sheets 20 of plastic material, are pressed into engagement with the side edge portions 32 of the channel members 28 by the support members 14 in the raised or closed position of such support members. As shown in FIG. 3, the support plates 14 are pivoted from the open position shown in dotted lines to the closed position shown in solid lines about hinges 16 to press the sidewall members 30 against the opposite sides of the jig 10.

The sidewall members 30 may be of any suitable plastic material such as polyvinyl chloride acetate, while the channel members 28 may be made of acrylonitrile butadiene styrene, or any other plastic material which can easily be sealed to the material of the side wall sheets 30. The channel members 28 have a generally U-shape cross section, with the opposite side edge portions 32 extending a short distance laterally from its middle portion to form two substantially parallel side flanges which extend the entire length of the member. The jig members 12 may be extruded aluminum members having a substantially H-shaped cross section including a large flange portion 34 forming one leg of the H-shape The side edge portions 32 of the channel members engage the opposite ends of the large flange portion 34 of the jig members 12.

A liquid solvent, such as acetone, may be employed to attach the sidewall sheets 30 to the channel members 28. To do this a pair of solvent sprayers 36 are attached to the opposite sides of each of the jig members by clamps 38 bolted thereto. Each of the sprayers 36 is provided with an elongated tubular nozzle 40 whose outlet is positioned in the space between the sidewall sheets 30 and the opposite ends of a small flange portion 42 of the jig member 12, as shown in FIG. 5. The nozzles 40 spray solvent at the top of the junction between the sidewall sheet 30 and the side edges 32 of the channel members 28 so that such solvent flows between such side edges and sheets and downward along the entire length of the junction by capillary action and gravity. The solvent softens the plastic so that the channel members 28 are sealed to the pair of sidewall members 30 along their side edges 32.

Figure 6:
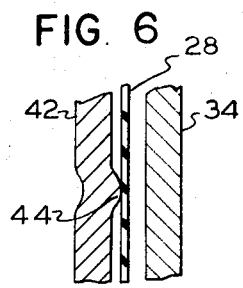
FIG. 6 is an enlarged fragmentary sectional view taken along the line 6—6 of FIG. 5.

A plurality of spacer bumps 44 may be provided on the outer surface of the small flange 42 of each jig member, as shown in FIG. 6. The spacer bumps 44 space the channel members 28 away from the surface of the small flange 42 so that even if any solvent should be deposited on the adjacent surfaces of the channel member 28 and such small flange, the channel member will not be bonded to the flange which otherwise might prevent removal of the liquid treating unit from the jig.

Figure 4:
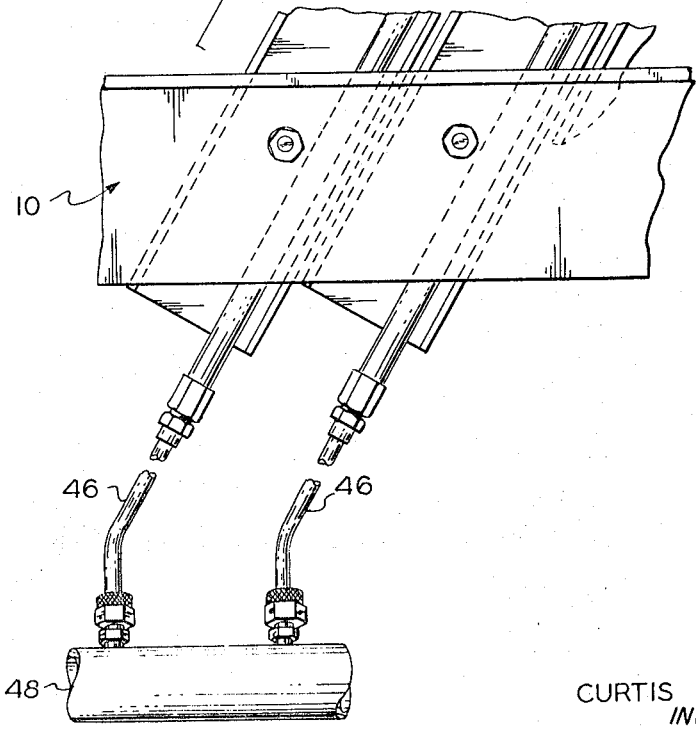
FIG. 4 is a fragmentary sectional view taken along the line 4—4 of FIG. 2 showing a portion of the jig on an enlarged scale.

As shown in FIGS. 1 and 4, most of the sprayers 36 are connected by inclined tubes 46 to one of a pair of horizontal distribution pipes 48 extending along the bottom of the jig 10 on opposite sides thereof. However the nozzles at the far left-hand end of the jig are connected to a pair of vertical distribution pipes 50 joined to the horizontal pipes. The liquid solvent is supplied to such distribution pipes from a storage container 52 through a siphon tube 54. The container 52 is positioned so that the upper level of the solvent liquid is slightly below the nozzles 40 of the sprayers to prevent solvent from flowing out of such nozzles except when a pulse of pressurized nitrogen or other inert gas is applied to the system as hereafter described. The siphon tube 54 has its inlet end immersed in the solvent within container 52 and its outlet end connected through a gate valve 56, a filter 58 and a check valve 60 to a main solvent pipe 61. The main pipe 61 is connected to the distribution pipes 48 and 50 for supplying liquid solvent to the sprayers 36.

A pressurized cylinder 62 provides a regulated source of nitrogen gas at approximately 40 p.s.i. pressure. The cylinder 62 is connected through a solenoid valve 64, to a coupling 66 having a large diameter chamber therein which communicates with the main solvent supply pipe 61 through a vertical stand pipe 68 and an air relief valve 70. In addition, another gate valve 72 may be provided in main pipe 61 between the junction of the vertical stand pipe 68 and the distribution pipes 48 and 50. Also since the pressure within the horizontal distribution pipe 48 decreases with distance along the pipe due to the solvent flowing through sprayers 36, a third horizontal distribution pipe 74 may be employed to connect the far right-hand end of the two horizontal distribution pipes 48 to the main supply pipe 61 in order to provide a more uniform pressure to all of the sprayers, as shown in FIG. 2.

The solvent spraying system operates as follows. First the gate valves 56 and 72 are opened to enable the distribution pipes 48 and 50 and the vertical stand pipe 68 and chamber 66 to be filled with solvent. Air relief valve 70 is opened at this time, as well as other air relief valves 76 at the ends of the vertical distribution pipes 50 and the horizontal distribution pipes 48 to remove any air from the system. Once the system is fully charged with solvent, all of the air relief valves are closed. When it is desired to spray solvent from sprayers 36, an electrical switch and timer (not shown) are actuated to connect the solenoid valve 64 to a source of electrical current to open such valve and cause nitrogen gas to be transmitted from the pressurized cylinder 62 into the chamber 66, causing solvent to flow out of such chamber which pressurizes the solvent in the other parts of the system. The resulting increase in solvent pressure closes the check valve 60 and causes solvent to flow through the distribution pipes 48 and 50 and out of the nozzles 40 of all of the sprayers 36. The timer automatically deactivates the switch after a predetermined period of time whereupon the solenoid valve 64 automatically returns to its closed position and stops the spraying of solvent. It should be noted that the solenoid valve passes through an intermediate position which enables the nitrogen gas in the chamber 66 to be exhausted to the atmosphere through such valve, which reduces the solvent pressure to normal and immediately stops the flow of the solvent liquid through the sprayers.

A catch pan 78 is provided beneath the jig 10 to catch any excess solvent dripping from the bottom of the jig members. Also an exhaust fan 80 is connected by suitable pipes or ducting to the left end of such catch pan to remove any volatile fumes from the building containing the manufacturing apparatus which are produced by evaporation of such excess solvent.

Figure 7:
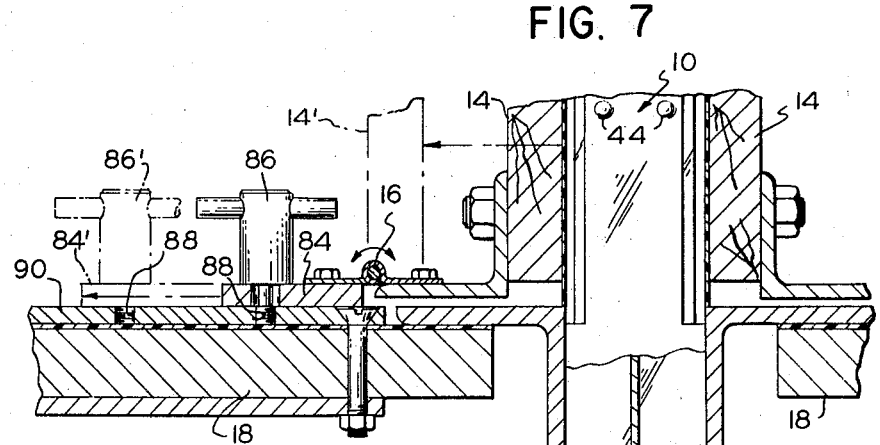
FIG. 7 is an enlarged fragmentary sectional view taken along the line 7—7 of FIG. 2, with the support plates in their raised position.
Figure 8:
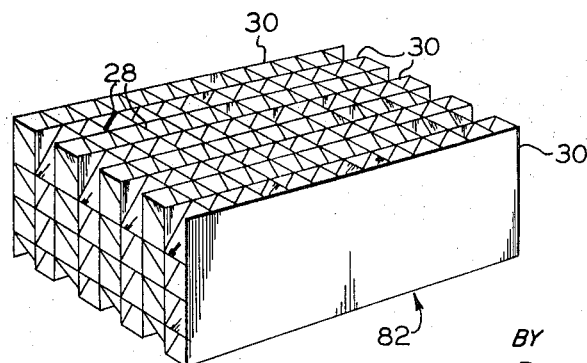
FIG. 8 is a perspective view of a liquid treating unit made by the apparatus of the present invention.

A complete multiple channel liquid treating unit 82 made by the apparatus of the present invention is shown in FIG. 8. The unit consists of a plurality of rows of inclined channels formed by interconnected channel modules each including a plurality of channel members 28 sealed between a pair of sidewall members 30. In order to interconnect the channel modules the hinges 16 of the support plates 14 are adjusted between a plurality of positions which are successively greater distances from the jig 10. Thus in the first position of hinges 16 in FIG. 7 the space between the support plates 14 is equal to one row of channels which may be, for example, 2 inches wide. In the second position three rows of channels formed by interconnecting two modules each one channel wide, are accommodated in the space which may be a total of 6 inches wide. In a third position seven rows of channels formed by interconnecting two modules each three channels wide, are accommodated in the space which may be a total of 14 inches wide, to form the complete unit. Of course wider units can be made by additional connection steps, for example, two modules each seven channels wide can be connected together to form a unit 30 inches wide. A portion of one such liquid treating unit 82 is shown in FIG. 8 in which the adjacent rows of channel members are inclined in opposite directions. This unit is described in greater detail in copending U.S. Pat. application Ser. No. 721,250, filed Apr. 15, 1968 by the present inventor.

As shown in FIG. 7, one hinge plate of each of the hinges 16 is attached to an adjustable mounting plate 84 which is secured to the top of the table 18 by a tightening bolt 86 whose threaded end extends through a clearance hole in mounting plate 84 and into one of a plurality of threaded apertures 88 provided on a plurality of mounting strips 90 attached to such table. Thus, after a plurality of modules having a single row of channels are formed, the hinges 16 and support plates 14 are moved to the dotted line positions to enable two of these single row modules to be connected together by another row of channel members 28 sealed between such modules to form a larger module having three rows of channels.

It should be noted that only two adjustable hinges 16 and associated mounting means 84, 86 and 88 may be provided for each support plate 14 at the opposite ends thereof. An adjustable clamp 92 is employed to hold the support plates 14 in firm engagement with the sidewall members 30 and channel members 28 in the raised position shown in FIG. 3, while the sealing operation is taking place. Of course after sealing, the clamp is removed and the support plates are pivoted down to the open position 14 to enable removal of the completed module.

Figure 9:
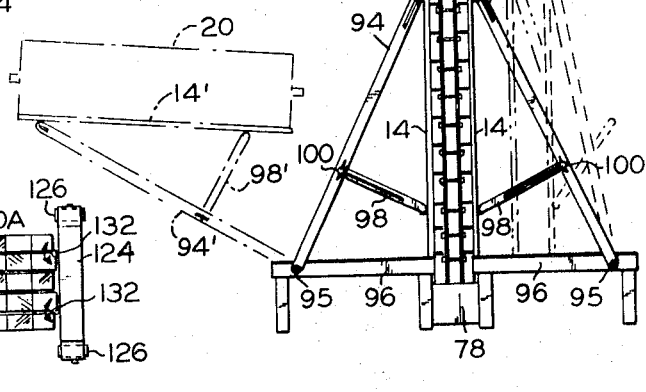
FIG. 9 is an elevation view of one end of another embodiment of the apparatus of the present invention having its support plates pivotally mounted in another manner.

Another embodiment of the apparatus of the present invention is shown in FIG. 9 which is similar to that of FIGS. 1 to 7, so that the same reference numerals have been used to designate like parts. The apparatus of FIG. 9 may be used to form modules of greater width of, for example, 6 inches wide which may require that the jig members each be made of two pieces of L-shaped cross section bolted together. The support plates 14 are fixedly attached to one end of a pivot arm 94 whose other end is pivotally attached at pivot 95 to the outer edge of each of a pair of walkways 96 extending down the opposite sides of the jig. As a result, the support plates 14 may be pivoted from the closed position shown in solid lines to the open position 14' shown in dashed lines to provide sufficient clearance between the side of the jig and the support plate to enable an operator to walk along the walkways 96 and load the jig with channel members. An adjustable link 98 connects the bottom end of the support plate 14 to the pivot arm 94. The link 98 is provided with an elongated slot so that the effective length of such link can be varied by loosening and resetting and tightening of a thumbscrew 100. This enables the support plates 14 to have several vertical positions spaced different distances 14A and 14B from the side of the jig 10 in order to allow the interconnection of two single-channel modules to form a three-channel module in position 14A, and to allow the joining of two two-channel modules together to form a five-channel unit in position 14B.

Figure 10:
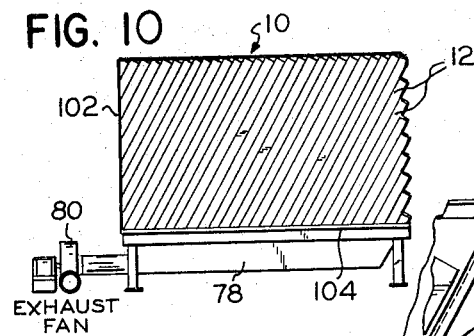
FIG. 10 is a plan view of the side of a third embodiment of the apparatus of the present invention which employs vacuum pressure to support the sidewall members.
Figure 11:
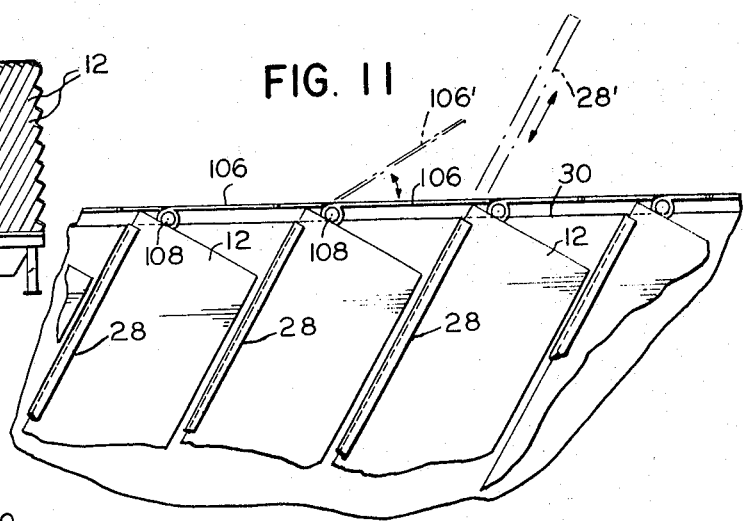
FIG. 11 is an enlarged view of a portion of the apparatus of FIG. 10.

Another embodiment of the present invention is shown in FIGS. 10 and 11 which is similar to that of FIGS. 1 to 7 except that the support plates 14 and associated mounting structure have been eliminated and instead air pressure employed to hold the sidewall members 30 in contact with the channel members 28. A lower air pressure or vacuum is provided within the channels by means of the exhaust fan 80 connected to the solvent catch pan 78, simply by sealing the left end of the jig 10 with a seal plate 102 and sealing the space between the top of the pan and the bottom of the jig with a seal plate 104. A plurality of hinged end plates 106 are pivotally mounted by pivots 108 on the top ends of each of the jig members 12, so that they overlap to close off the top and right end of the jig except for a narrow space between the edge of the sidewall members 30 and such end plates. Thus only a small amount of air enters the sealed chambers provided between the channel members 28 and the differential air pressure produced by the exhaust fan 80 holds the sidewall members 30 pressed against the edges of the channel members to enable the sealing thereof as described previously. After sealing the channel members 28 to the sidewall sheets 30, the completed module is removed from a jig simply by pulling upward in a similar manner to the other embodiments previously described. Thus the hinged end plates may be pivoted into the raised position 106' shown in dashed lines to enable insertion and removal of the channel members as shown in FIG. 11.

Figure 12:
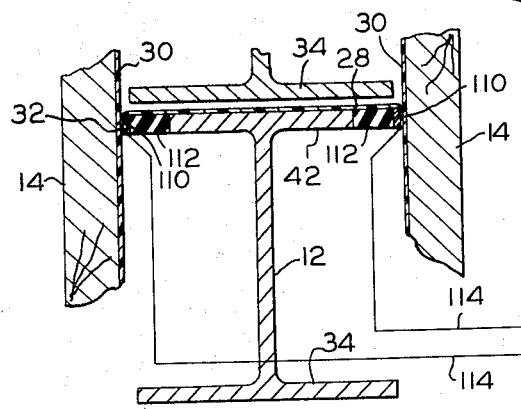
FIG. 12 is a section view of a portion of a fourth embodiment of the apparatus of the present invention in which electrical heating elements are employed as the sealing means.

Still another embodiment of the present invention is shown in FIG. 12 which is similar to any of these described above except that the solvent sprayers 36 and associated apparatus are eliminated and a pair of electrical heating elements 110 are secured to the opposite edges of the smaller flange portion 42 on each of the jig members 12 and extend beneath the entire length of the side edges 32 of the channel members 28. The heating strips 110 are thermally and electrically insulated from the jig member by strips 112 of plastic or other insulating material between such heating strips and the edges of flanges 42. The upper terminals of the heating elements 110 may be electrically connected by lead wires 114 to one terminal of a heating current supply 116 through a variable resistor 118. The bottom end of each of the heating strips 110 may be grounded to the other terminal of the heating current supply 116, which may be any suitable source of AC or DC voltage. The amount of heating current flowing through the strips 110 and therefore the sealing temperature may be controlled by adjusting the setting of the variable resistor 118 so that the side edges 32 of the channel members 28 are properly fused to the sidewall members 30. Of course other heat-sealing apparatus can be employed, including ultrasonic heating directly through the jig members. Also the heating strips may be mounted on the inner surface of the support plates 14 in spaced, insulated relationship positioned over the side edges 32 of the channel members in the closed position of such support plates.

Figure 13:
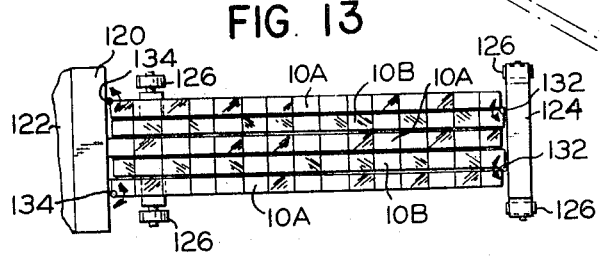
FIG. 13 is a plan view of the top of a fifth embodiment of the apparatus of the present invention in which a plurality of jigs are employed to enable the entire liquid-treating unit to be formed with one sealing step.
Figure 14:
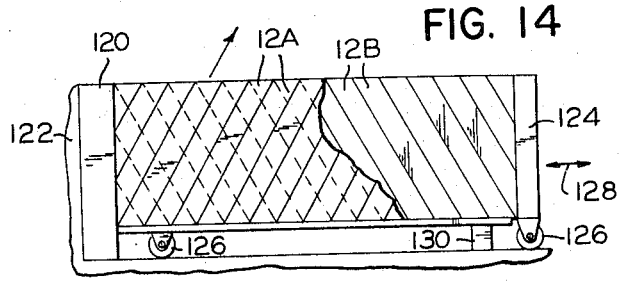
FIG. 14 is an elevation view of a side of the apparatus of FIG. 13.

Still another embodiment of the present invention is shown in FIGS. 13 and 14, in which a plurality of separate jigs 10A and 10B are employed simultaneously to enable a complete unit of a plurality of rows of channels to be formed by a single sealing step. Thus, a fixed jig support 120 is provided which is fixedly attached in any suitable manner to a wall 122 or other stationary object, and three separate jigs 10A are mounted on each support. A movable jig carriage 124 is also provided and has a pair of jigs 10B mounted thereon which are positioned between jigs 10A. The carriage 124 may be provided with wheels 126 adjacent its front and rear ends to permit movement of jigs 10B relative to jigs 10A in the direction of arrows 128, which is necessary to enable removal of the completed unit from the jigs. Thus, since the channel members 12A and 12B of adjacent jigs 10A and 10B, respectively, are inclined in opposite directions, they interfere with removal of the completed unit and it is necessary to provide relative movement between jigs 10A and 10B to enable removal of such unit. The right-hand ends of the jigs 10A may be supported on legs 130 since the carriage wheels 126 supporting the left end of the movable jigs 10B would not contact such legs because such wheels need slide only about half the length of the jig to enable removal of the completed unit. It should be noted that the support plates 14 for holding the outer two sidewall members 30 have not been shown in FIGS. 13 and 14 for purposes of clarity, but may be similar to that of FIGS. 1 to 7 or FIG. 9. The other sidewall members 30 are inserted between adjacent jigs 10A and 10B. Of course, while for purposes of strength it is preferable to form the water-settling unit with alternate rows of channels inclined in opposite directions, it is also possible to form such unit with all of the rows of channels inclined in the same direction, in which case it would not be necessary to provide relative movement between the jig supports to enable removal of the completed unit from such jigs. A clamping means (not shown) similar to clamp 92 of FIG. 3, may be employed to clamp the support plates and all of the jigs of FIG. 13 together to insure good contact between the sidewall members 30 between such jigs and the channel members 28 held within the jigs. For this reason the jigs 10A and 10B are attached by vertical hinges or other pivots 132 and 134, respectively, to the jig mounts 120 and 124 to enable sideways movement during clamping.

Cardboard or treated paper may be employed in place of the plastic sheeting for the channel members 28 and the sidewall members 30 and such sheets may be glued to such channel members. In this case, rather than sprayers 36, a suitable glue-applying apparatus may be employed, such as a pair of roller applicators on opposite sides of the jig 10 which roll glue over the opposite edges of all the channel members.

It will be obvious to those having ordinary skill in the art that many changes may be made in the above described details of the preferred embodiments of the present invention without departing from the spirit of the invention. Therefore the scope of the present invention should only be determined by the following claims.

I claim:

1. Apparatus for manufacturing a multiple channel liquid treating unit, comprising:
    rigid jig means of fixed dimensions for fixedly supporting a plurality of channel members of the same width in a predetermined inclined spaced relationship to form at least one row of parallel channel members, said channel members each having a length extending along two opposite sides edges which is much greater than its width extending between said side edges;

support means for rigidly supporting a pair of sidewall members substantially parallel on opposite sides of said jig means in engagement with the side edges of the channel members; and sealing means for attaching said channel members to said wall members at said side edges to form said liquid treating unit with at least one row of open ended liquid channels which are separated from each other to enable liquid to flow through each channel and for enabling the unit to be removed from the jib means.

2. Apparatus in accordance with claim 1 in which the sealing means is a means for simultaneously attaching all of the channel members between the pair of wall members to form a row of channels by sealing the side edges of said channel members to said wall members.

3. Apparatus in accordance with claim 1 in which the support means includes movable support means for moving between a first, open position extending lateral to the sides of the jig means, wherein the sidewall members are spaced from the channel members, and a second, closed position substantially parallel to the sides of the jig means wherein said sidewall members engage the side edges of the channel members.

4. Apparatus is accordance with claim 1 in which the support means includes air pressure means for holding the sidewall members in engagement with the channel members by air pressure.

5. Apparatus in accordance with claim 4 in which the air pressure means includes closure means provided on the jig means for forming a plurality of vacuum chambers with the sidewall members and a plurality of spaced jig members in said jig means, and vacuum means for providing said chambers with a lower pressure than the surrounding atmosphere.

6. Apparatus in accordance with claim 5 in which the closure means includes a plurality of end plates pivotally mounted adjacent the upper ends of the jig members for closing the top of the jig means to enable a vacuum to be formed in said chambers and for opening said top to enable removal of the treating unit.

7. Apparatus in accordance with Claim 1 in which the jig means supports the channel members with their ends in two parallel planes and with said channel members inclined at an acute angle with respect to said planes.

8. Apparatus in accordance with claim 7 in which the jig means includes a plurality of jig members supported in a row and inclined in the same direction, said jig members being spaced apart to provide guide slots between adjacent jig members, said slots having widths approximately the same as the thickness of the channel members to enable said channel members to be held in said slots.

9. Apparatus in accordance with claim 3 in which the movable support means includes a pair of support plates pivotally mounted by pivot means on the opposite sides of the jig means for pivoting between said open and closed positions.

10. Apparatus in accordance with claim 9 in which the pivot means of each support plate has a pivot axis parallel to the sides of said jig means.

11. Apparatus in accordance with claim 10 in which the pivot means are adjustable to vary the distance of their pivot axis from the jig means in order to change the spacing between the support plates and the side of the jig means in said closed position to enable two previously formed treating units to be supported so that one of the sidewalls of each unit engages the opposite sides of the channel members to enable a larger unit to be formed thereof which includes at least three rows of channels.

12. Apparatus in accordance with claim 2 in which the sealing means includes applicator means for applying a bonding liquid to the seal region between the side edges of the channel members and the wall members.

13. Apparatus in accordance with claim 12 in which the applicator means includes a plurality of spray nozzles attached to the jig means for spraying said bonding liquid on at least the top of the side edges of each of said channel members.

14. Apparatus in accordance with claim 13 in which the bonding liquid is a solvent for the plastic from which the channel members and wall members are made.

15. Apparatus in accordance with claim 2 in which the sealing means includes heater means for fusing the channel members to the sidewall members.

16. Apparatus in accordance with claim 15 in which the heater means includes a plurality of electrical heating elements supported on the opposite sides of each of a plurality of spaced jig members forming said jig means in position to heat the side edges of said channel members.

17. Apparatus in accordance with claim 2 which also includes feeder means for supplying the sidewall members, including a pair of spools of sheet material rotatably mounted on opposite sides of he jig means adjacent said support means for feeding the two sheets onto said support means, and cutting means for cutting off the end portions of said sheets on said support means to form said pair of wall members.

18. Apparatus in accordance with claim 17 in which the sheets and wall members formed therefrom are of plastic material, said wall members being supported on a pair of support plates pivotally mounted on the opposite sides of the jig means for pivoting between said open and closed positions and being sealed to channel members of plastic material in said closed position.

19. Apparatus in accordance with claim 1 in which the jig means includes a first jig holder having a plurality of jig members mounted thereon to form a plurality of first rows of spaced jig members inclined in a first direction, a second jig holder having a plurality of second rows of spaced jig members inclined in a second direction opposite to said first direction which are positioned between and spaced from said first rows to enable sidewall members to be supported between the adjacent first and second rows and to enable channel members to be supported between adjacent jig members for attachment between said sidewall member to form a multiple row treatment unit having a plurality of rows of inclined channels with adjacent rows inclined in opposite directions, and means for moving said jig holders relative to enable removal of said multiple row unit from said jig means.

20. Apparatus in accordance with claim 19 in which one jig holder is held in a fixed position and the other jig holder is mounted on a wheeled carriage for movement therewith.

* * * * *

UNITED STATES PATENT OFFICE
CERTIFICATE OF CORRECTION

Patent No. 3,617,420　　　　Dated November 2, 1971

Inventor(s) Curtis E. McCann

It is certified that error appears in the above-identified patent and that said Letters Patent are hereby corrected as shown below:

Column 2, line 1, "manufactured" should read -- manufacturing --. Column 6, line 19, "each support" should read -- such support --. Column 7, line 9, cancel "open ended"; line 10, before "separated" insert -- open at their opposite ends and are --; line 11, "and for enabling" should read -- , said support means releasing said side wall members to enable --; line 12, "jib" should read -- jig --.

Signed and sealed this 16th day of May 1972.

(SEAL)
Attest:

EDWARD M.FLETCHER,JR.　　　　　　　ROBERT GOTTSCHALK
Attesting Officer　　　　　　　　　Commissioner of Patents